United States Patent [19]
Shimada

[11] Patent Number: 5,893,649
[45] Date of Patent: Apr. 13, 1999

[54] CAMERA-MOUNTED VTR

[75] Inventor: Mitsuhiro Shimada, Chiba, Japan

[73] Assignee: Sony Corporation, Japan

[21] Appl. No.: 07/701,812

[22] Filed: May 17, 1991

[30] Foreign Application Priority Data

May 25, 1990 [JP] Japan ..................... 2-136630

[51] Int. Cl.[6] .................. G03B 13/02; G03B 17/02; H04N 5/225
[52] U.S. Cl. .................. 396/383; 396/535; 348/333; 348/376
[58] Field of Search .................. 354/288, 82, 223; 358/906, 254, 335; 360/33.1, 137.1; 396/373, 374, 383, 535; 348/333, 373, 376, 341, 369; 386/118

[56] References Cited

U.S. PATENT DOCUMENTS 4,695,905  9/1987  Utsugi ..................... 358/335

OTHER PUBLICATIONS

Operation Manual for Model No. CCD-TRS Sony Video Camera Recorder 8, 1989.
Operation Manual for Model No. CCD-TR7 Sony Video Camera Recorder 8, 1990.
Operation Manual for Model No. CCD-TR81 Sony Video Camera Recorder Hi 8, 1991.
Test Reports, May 1, 1990, pp. 82–83, Len Feldman, "Video Review".

*Primary Examiner*—Safet Metjahic
*Assistant Examiner*—J. K. Han
*Attorney, Agent, or Firm*—Ronald P. Kananen; Rader, Fishman & Grauer

[57] ABSTRACT

A camera-mounted VTR having a grip part for holding a main unit of the VTR at one side surface of the main unit of the VTR. A view finder is provided at the main unit of the VTR in such a way as it may be raised or inclined in respect to the main unit of the VTR and at the same time a recording button is arranged at a location hidden by the view finder when the main unit of the VTR is inclined.

3 Claims, 14 Drawing Sheets

CAMERA-MOUNTED VTR

BACKGROUND OF THE INVENTION

1. Field of the Invention

This invention relates to a camera-mounted VTR which can be used while a view finder is set at a low angle under its raised state.

2. Description of the Prior Art

An 8-mm camera-mounted VTR is well known in the art. This prior art will be described more practically in reference to FIGS. 16 and 17, wherein reference numeral 100 denotes a camera-mounted VTR, a right side of a main unit 101 of the VTR is a grip part 102 for holding the main unit 101 of the VTR, and its opposite side is a VTR deck 103 composed of a well-known cassette holder, a tape loading mechanism and a rotary head drum or the like. At the front surface of the front part 101a of the main unit 101 of the VTR is provided with a camera lens 104 and a microphone 105, and a view finder 106 is arranged from the upper part of the grip part 102 of the main unit 101 of the VTR to its rear part.

The aforesaid view finder 106 is substantially composed of a view finder main body 107 comprised of a pair of upper and lower cases, a CRT (a cathode ray tube) (CRT) (not shown) stored in the view finder main body 107 and an eye lens barrel 110 having a visibility adjusting means 108 and an eye cap 109 or the like. As shown in FIG. 17, a start/stop push type recording button 111 is arranged at a position where a thumb of a user may abut against a rear surface 102a of the grip part 102 of the main unit 101 of the VTR. This recording button 111 is seen or hidden under a sliding movement of a sliding button 112 acting as an operating button, sliding in a vertical direction of a longitudinal recess part 102b formed at the rear surface 102a of the grip part 102. The recording button 111 is covered by the sliding button 112 to enable a non-required recording to be prevented from being carried out. In FIG. 17, reference numeral 113 denotes a grip belt arranged at a side surface of the grip part 102.

SUMMARY OF THE INVENTION

This invention relates to a camera-mounted VTR having a grip part for holding the main unit of the VTR at one side part of the main unit of the VTR, wherein a view finder is arranged at the main unit of the VTR in such a way as the view finder may be raised or lowered, and a recording button is arranged at a location hidden by the view finder when the main unit of the VTR is inclined. Thereby, when the view finder is used at a low angle, the recording button may easily be acknowledged by eye and operated and an easy recording can be performed.

In case of the prior art camera-mounted VTR 100 described above, it has a structure in which a sliding button 112 is slid upwardly to depress the recording button 111, so that during the recording operation, the sliding button 112 can be used as a finger rest. However, since the sliding button 112 is just above the recording button 111, its use is inconvenient and in particular, in case that the view finder 106 can be raised up to its vertical state and the view finder 106 is used at a low angle, a user sees the eye cap 109 of the view finder 106 from just above the raised view finder 106. It thus shows a problem that the recording button 111 arranged at a rear surface 102a of the grip 102 is hardly acknowledged and its operation is not easily carried out.

In view of the foregoing, the present invention provides a camera-mounted VTR in which the recording button may easily be acknowledged and simply operated when the view finder is used at a low angle.

In the present camera-mounted VTR having a grip for use in holding the main unit of the VTR at one side surface of the main unit of the VTR, the view finder is arranged at the main unit of the VTR in such a way as it may be raised or inclined and at the same time a recording button is installed at a location in the main unit of the VTR hidden by the view finder when the view finder is inclined.

Since the recording button is placed below the inclined view finder of the main unit of the VTR, the recording button may easily be acknowledged by eyes and operated when the view finder is raised and used at a low angle.

DESCRIPTION OF THE PREFERRED EMBODIMENT

Figure 1:
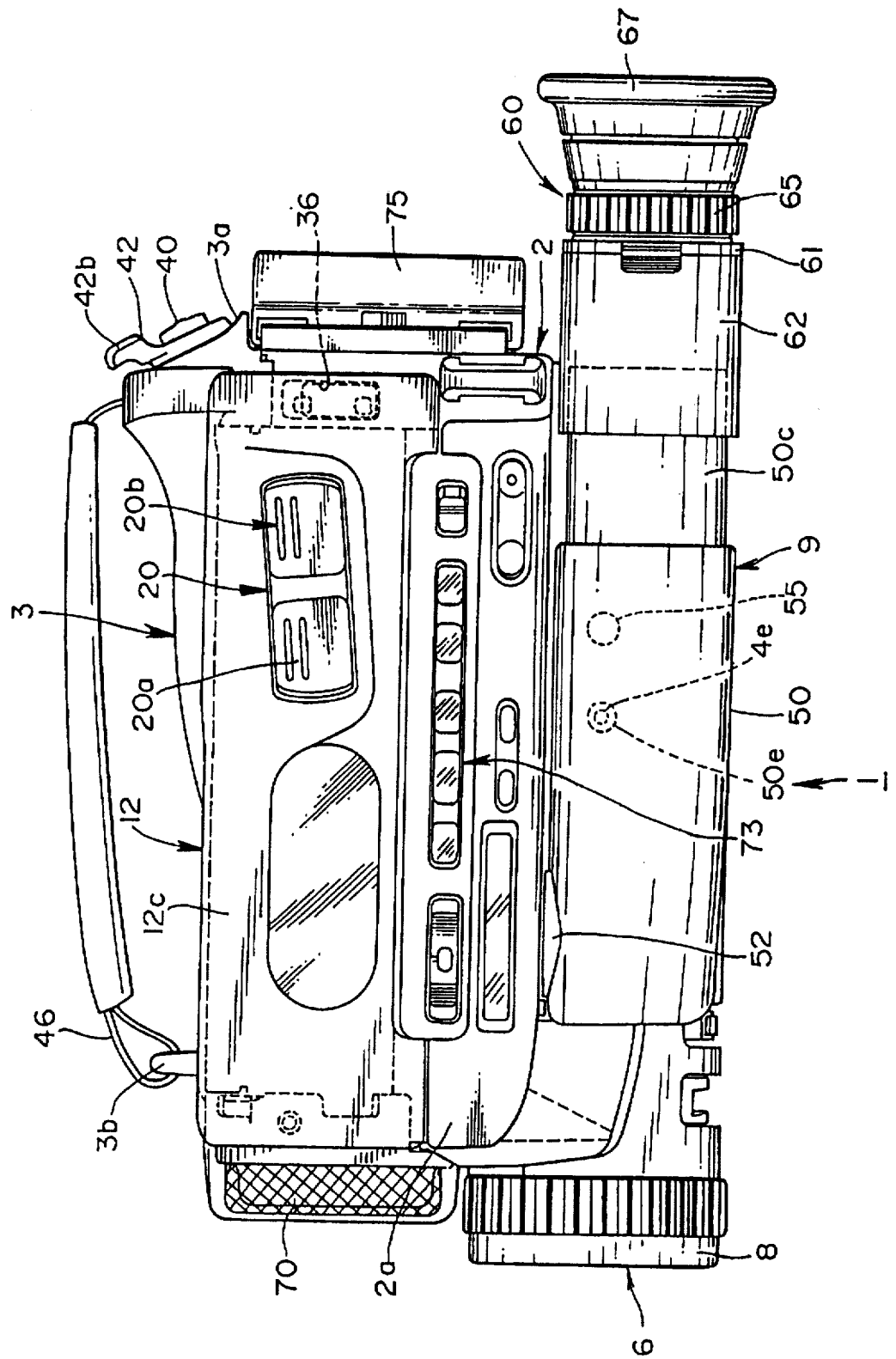
FIG. 1 is a top plan view for the camera-mounted VTR for showing one preferred embodiment of the present invention.

Referring now to the drawings, one preferred embodiment of the present invention will be described.

In FIGS. 1 to 6, reference numeral 1 denotes an 8-mm camera-mounted VTR, and a main unit 2 of the VTR is susbtantially formed in a rectangular parallelepiped. A right side surface of the main unit 2 of the VTR is formed as a grip for holding the main unit 2 of the VTR, and a substantial central part 4a of the opposite left side surface 4 of the grip 3 is formed as a semi-cylindrical shape and set laterally and projected. A VTR deck 5 is arranged from the lower part of the grip part 3 to the upper part. In addition, a camera lens 6 is stored within a substantial central part 4a of the left side surface 4. A front part of the lens barrel 8 having a zoom lens 7 of the camera lens 6 is projected forwardly. At the same time, a view finder 9 for confirming a recording image is arranged from the front side of the upper part of the left side surface 4 to the rear side.

Figure 10:
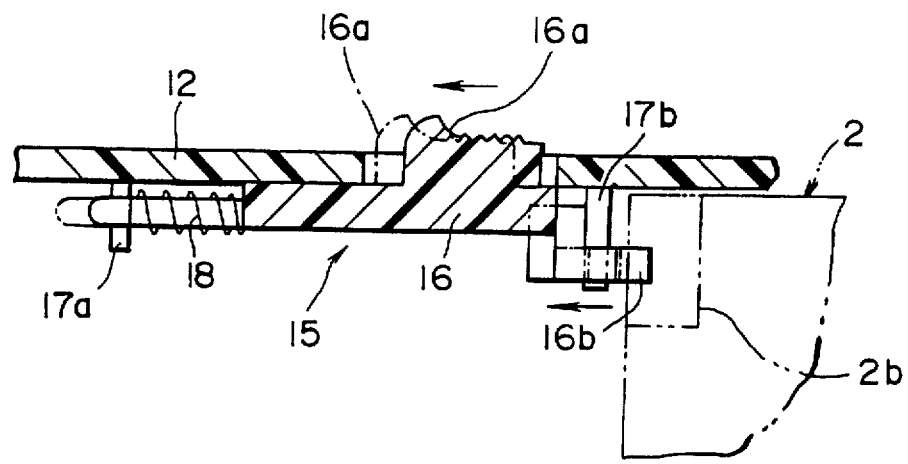
FIG. 10 is a sectional view of a lock mechanism of the lid member.

The upper part of the grip 3, i.e. the upper part of the VTR deck 5 is provided with an opening 11 through which a tape cassette 10 is loaded or unloaded. The opening 11 can be opened or closed by a lid member 12 having a substantial L-shaped section. Describing in detail, the lid member 12 is manually turned upwardly within a range of about 90° through a pair of rod-like pins 13 and 13 spaced apart by a predetermined distance at the inner predetermined locations from the upper surface 2a of the main unit 2 of the VTR and through a link 14 arranged at the front side of the opening 11. The lid member 12 can hold the closed state of the opening 11 with a lock mechanism 15. This lock mechanism 15 is composed of a lock button 16 having an operating part 16a projected out of a rectangular hole formed at a side surface 12a of the lid member 12 and sliding along an inner surface of the lid member 12 through a pair of guides 17a and 17b arranged at the inner surface of the lid member 12. A coil spring 18 is provided for biasing to cause an extreme end engaging part 16b of the lock button 16 to be always engaged with the engaging part 2b formed at a front side of the opening 11 of the main unit 2 of the VTR. As shown in FIG. 10, the operating part 16a of the lock button 16 is pushed against a biasing force of the coil spring 18 in a direction of an arrow shown in this figure. Thereby, the extreme end engaging part 16b of the lock button 16 is moved away from the engaging part of the main unit 2 of the VTR and then the locked state of the lid member 12 is released. In addition, since the extreme end engaging part 16b of the lock button 16 is slightly tapered, a slight depressing on the upper surface 12c of the lid member 12 causes the lock button 16 to be biased toward a direction opposite to the arrow by a coil spring 18 to move slightly in a direction of an arrow, the extreme end engaging part 16b of the lock button 16 is engaged with the engaging part 2b of the main unit 2 of the VTR. Thereafter, the engaging part 16b returns to lock the closed state of the lid member 12.

The upper surface 12c of the lid member 12 is provided with a zoom operating button 20 for use in moving in a forward or a rearward direction a lens barrel 8 having a zoom lens 7 at the camera lens 6. This zoom operating button 20 is made such that its upper surface becomes a pair of operating surfaces 20a and 20b slightly inclined in a V-shape. The button 20 may be pivoted like a so-called seesaw type by a rod-like shaft 22 placed between a pair of supporting plates 21 and 21 of substantial M-shape projected to a rear plate 19 of the lid member 12. Either one of the pair of operating surfaces 20a and 20b of the zoom operating button 20 is depressed, whereby the projections 20c and 20d formed at the rear surface of each of the operating surfaces 20a and 20b push a pair of push-type switches 23 and 24 projected at the rear surface 19 for performing a zoom-up and a zoom-down operation so as to turn on/off each of the switches 23 and 24, respectively. In this case, when one operating surface 20a of the zoom operating button 20 is depressed, the lens barrel 8 of the camera lens 6 is projected forwardly through a zoom-up switch 23 so as to perform the zoom-up operation. In turn, when the other operating surface 20b is depressed, the lens barrel 8 of the camera lens 6 is retracted through the zoom-down switch 24 and then a zoom-down operation is carried out.

Figure 4:
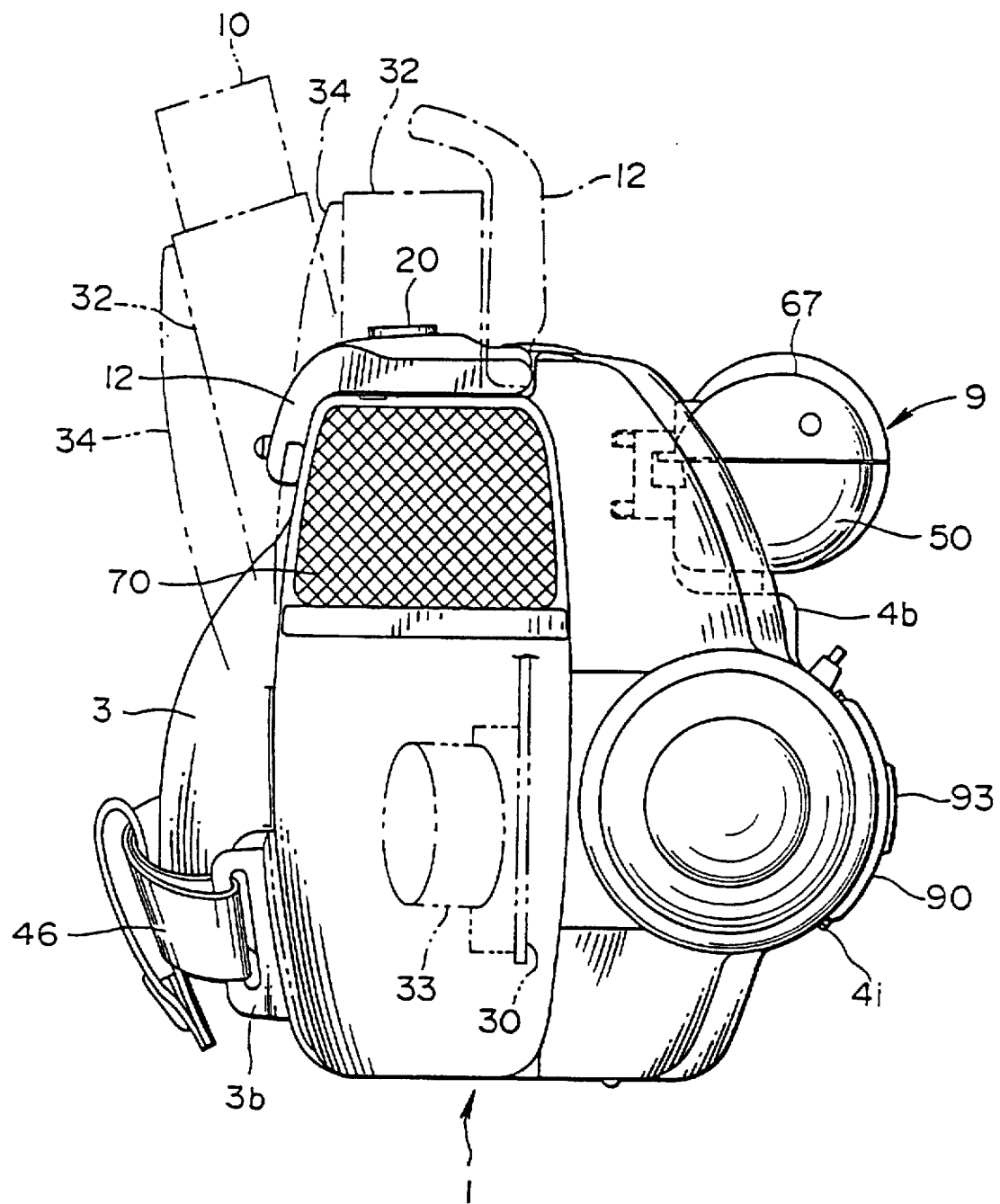
FIG. 4 is a front elevational view of the VTR.

In this case, the VTR deck 5 is substantially comprised of a cassette holder 32 for holding and installing the tape cassette 10 in a pair of reel blocks 31 and 31 of a chassis 30 arranged within the grip 3; a tape loading mechanism not shown; and a rotary head drum 33 rotatably supported at the chassis 30. To the cassette holder 32 is fixed a rectangular cassette lid 34 also acting as a side plate of the grip 3 and then the afore-said one reel block 31 can be seen through a transparent window 35 arranged at the cassette lid 34. The cassette holder 32 and the cassette lid 34 are arranged near one end of the opening 11 of the main unit 2 of the VTR, and they are constructed such that they are turned outwardly or moved in parallel outwardly after their upward movement as shown in FIG. 4 by a dotted line and two-dotted line through a driving mechanism (not shown) driven by a cassette taking-out button, acting as an ejecting button, 36 not viewed from outside when the lid member 12 is closed, and thus the tape cassette 10 may easily be loaded or unloaded.

Figure 11:
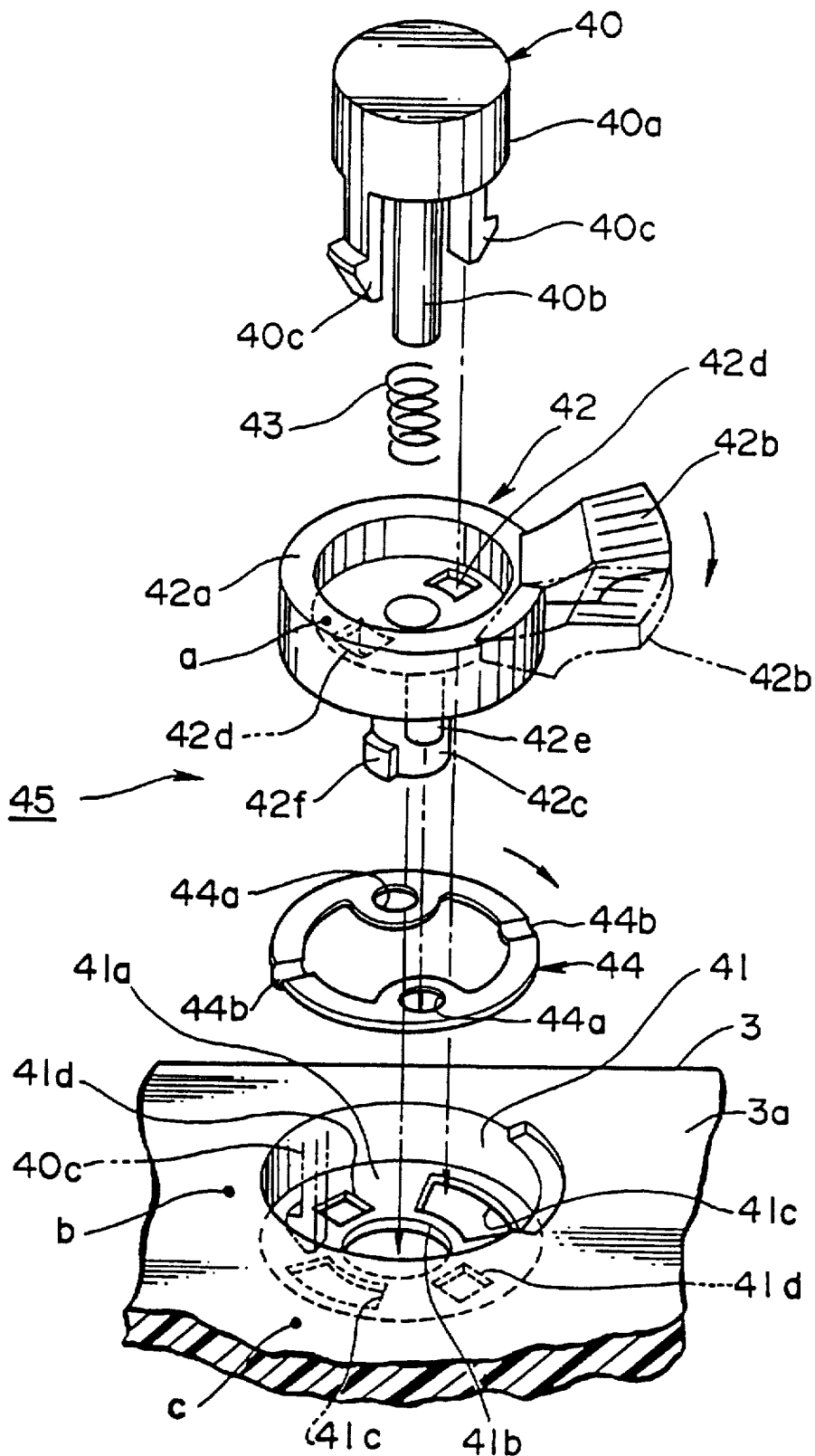
FIG. 11 is an exploded perspective view for showing a recording switch structure.

In addition, at a position of the rear surface 3a of the grip part 3 where a thumb of the user may abut is arranged a start/stop push type recording button 40. This recording button 40 may freely be locked or unlocked by the operating lever 42 which is rotatably supported at a cylindrical cavity 41 integrally formed at the rear surface 3a of the grip 3. Describing in detail, as best seen in FIG. 11, the recording button 40 is made of resin and it has an operating part 40a formed in a column shape; a shaft part 40b integrally extending downwardly from the operating part 40a; and a pair of claws 40c and 40c integrally extending downwardly from the operating part 40a. A central part of the bottom part 41a of the cavity 41 is formed with a circular central hole 41b and at the same time each of a pair of large and small engaging holes 41c, 41c, 41d and 41d spaced apart by 90° is formed around the central hole 41b. The operating lever 42 is made of resin and formed into a substantial annular cylinder. An outer partial side of the barrel 42a is integrally formed with a projected operating part 42b and at the same time a lower part of the lower surface of the barrel 42a is integrally projected and formed with a cylindrical shaft 42c into which the shaft 40b of the recording button 40 extends. Around the bottom side shaft 42c of the barrel 42a are formed a pair of insertion engaging holes 42d and 42d to which the pair of claws 40c and 40c of the recording button 40 are inserted or engaged. The recording button 40 is biased upwardly within the barrel 42a of the operating lever 42 through a compression coil spring 43 and can be freely moved in a vertical direction in a range in which the extreme hooks of a pair of claws 40c and 40c are engaged with the bottom lower surface of the barrel 42a. A pair of pins 42e and 42e are projected and formed at the bottom surface of the barrel 42a of the operating lever 42. A pair of holes 44a and 44a of a ring-shaped leaf spring 44 are fitted to a pair of pins 42e and 42e. A start/stop type recording switch mechanism 45 is substantially composed of these recording button 40, operating lever 42, compression coil spring 43 and leaf spring 44.

The recording button 40, operating lever 42, compression coil spring 43 and leaf spring 44 are assembled and the shaft 42c of the operating lever 42 is inserted into the central hole 41b of the cavity 41. However, a pull stopper piece 42f integrally projected and formed at the lower part of the shaft 42c is engaged with a knob holder (not shown) fixed to the lower part of the cavity 41 so as to be hooked. Then, a state in which a pair of engaging parts 44b and 44b formed in an inverted V-shape at the leaf spring 44 are engaged with a pair of small engaging holes 41d and 41d of the cavity 41 corresponds to a locked state of the recording button 40 (a state in which a black point (a) coated on the operating lever 42 and a black point (b) coated on the rear surface 3a of the grip 3 coincide with each other corresponds to the locked state of the recording button 40 in FIG. 11), and as the operating lever 42 is rotated from this state toward an arrow direction as shown in FIG. 11, the recording button 40 becomes unlocked (a state in which the black point (a) coated on the operating lever 42 and the black point (c) coated on the rear surface 3a coincide with each other corresponds to the unlocked state of the recording button 40), and the pair of claws 40c and 40c of the recording button 40 enter a pair of large engaging holes 41c and 41c of the cavity 41 to enable the shaft 40b of the recording button 40 to be moved downwardly. This state is a stand-by state and, when the recording button 40 is pushed downwardly from this state against the biasing force of the compression coil spring 43, the shaft 40b may turn on/off the recording switch of a push type start/stop not shown, and then the recording/recording stop is carried out. This recording switch may act as a start switch for applying an instruction to start the recording through one-pushing operation, and it is also a start/stop type acting as a stop switch for applying an instruction of a recording stop through two pushing operations. In case recording is not required, if the operating lever 42 is kept at a state shown by a solid line in FIG. 11, the pair of claws 40c and 40c of the recording button 40 abut against the bottom part 41a of the cavity 41, the recording button 40 descends and the recording switch may not be turned on/off. In addition, a grip belt 46 is placed over a pair of engaging segments 3b and 3c integrally formed at the lower part of the side surface of the grip 3. To the grip belt 46 is fixed a lens cap 47 for covering the zoom lens 7 of the lens barrel 8 of the camera lens 6.

In addition, the aforesaid electronic view finder 9 is arranged such that it may be turned by about 90° from its inclined state (horizontal) state to a raised (vertical) state at a stepped part formed at the upper side of the left side surface 4 of the main unit 2 of the VTR. Describing in detail, the electronic view finder 9 is substantially comprised of a cylindrical view finder main body 50 composed of a pair of upper and lower cabinets 50a and 50b; a CRT (a cathode ray tube) 51 stored within a view finder main body 50 and of which tube surface is exposed from a rectangular hole 50d formed at a front surface of the extreme end 50c; and an eye lens barrel 60 arranged at an extreme end 50c of the view finder main body 50 in such a way as it may be advanced or retracted in respect to it.

Figure 3:
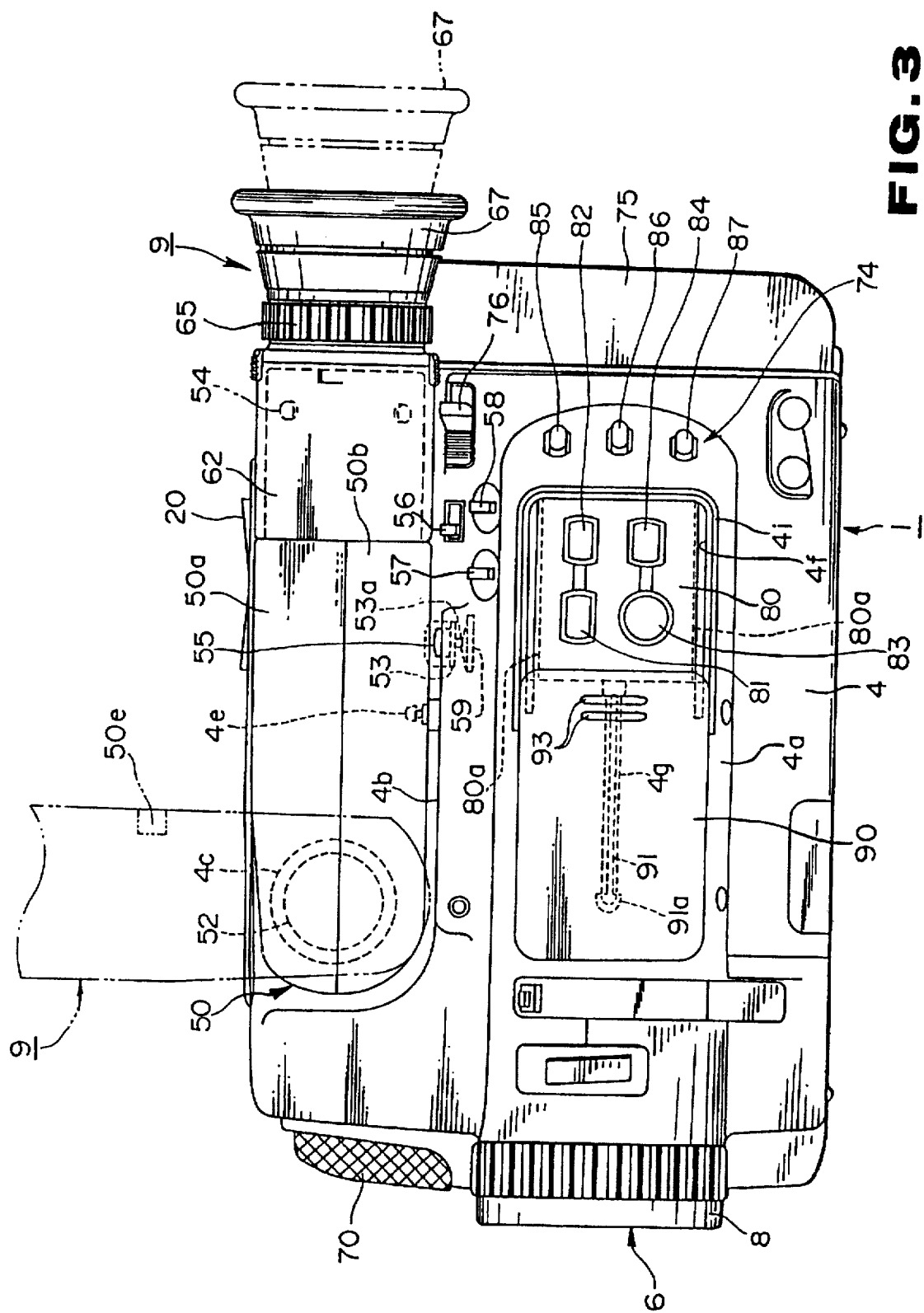
FIG. 3 is a left side elevational view.

The view finder main body 50 is made such that a shaft 52 projected and formed at its base end surface is fitted through a predetermined means in such a way as it may be rotated in a range of about 90° to a fitting part 4c formed at the left side surface 4 of the VTR main unit 2. A lower part of the lower cabinet 50b of the view finder main unit 50 is formed with a cavity 50e. An upper surface of the step 4b of the VTR main unit 2 corresponding to the cavity 50e is provided with a substantial convex engaging pin 4e projected thereto. When the electronic view finder 9 is inclined, a substantial convex engaging pin 4e projected at the step 4b is engaged with the concave engaging part 50e of the view finder main unit 50, whereby the electronic view finder 9 is not moved outwardly and then its inclined state is kept. As shown in FIG. 3, in addition to the recording button 40, a start/stop pushing type recording button 55 is arranged at a location where it is hidden by the view finder main unit 50 when the electronic view finder 9 at the upper surface of the step part 4b of the left side surface 4 of the VTR main unit 2 is inclined. As this recording button 55 is depressed downwardly, the shaft 53a of the fixing plate 53 turns on/off the push type recording switch 59 against a resilient biasing force of the resin fixing plate 53 attached so as to perform a recording start/recording stopping operation. That is, this recording switch 59 may act as a start switch for applying an instruction to start recording through one pushing operation and also act as a start/stop type acting as a stop switch for applying an instruction to stop recording operation through two pushing operations. The fixing plate 53 is fixed at a predetermined position in an inner wall of the substantial central part 4a by means of melting or adhering or the like. Reference numeral 56 in FIG. 3 denotes an editing switch, reference numeral 57 denotes a date button and reference numeral 58 denotes a time feeding button.

Figure 12:
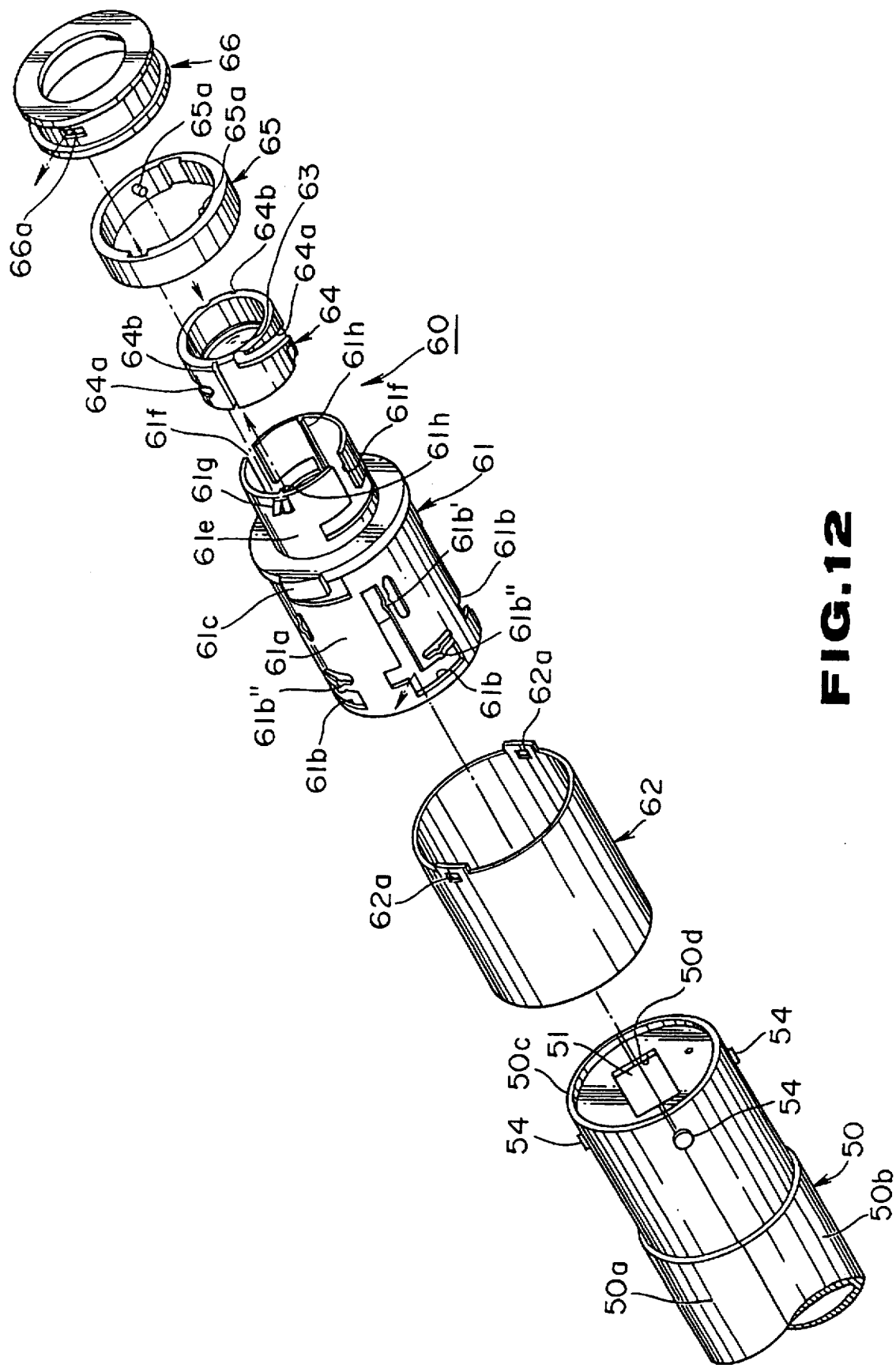
FIG. 12 is an exploded perspective view for showing a substantial part of the view finder.
Figure 13:
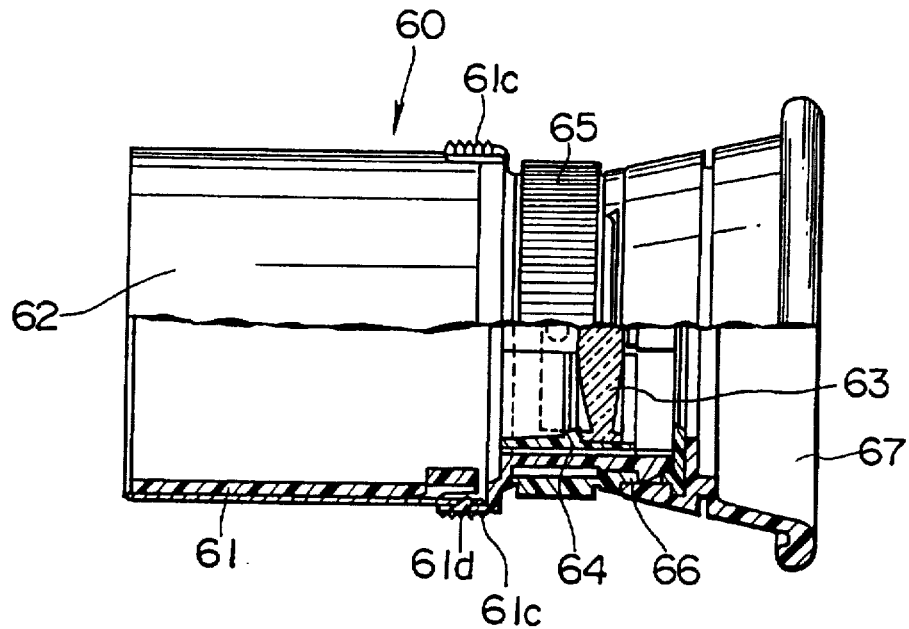
FIG. 13 is a side elevational view for showing an eye lens barrel partly in section.
Figure 14:
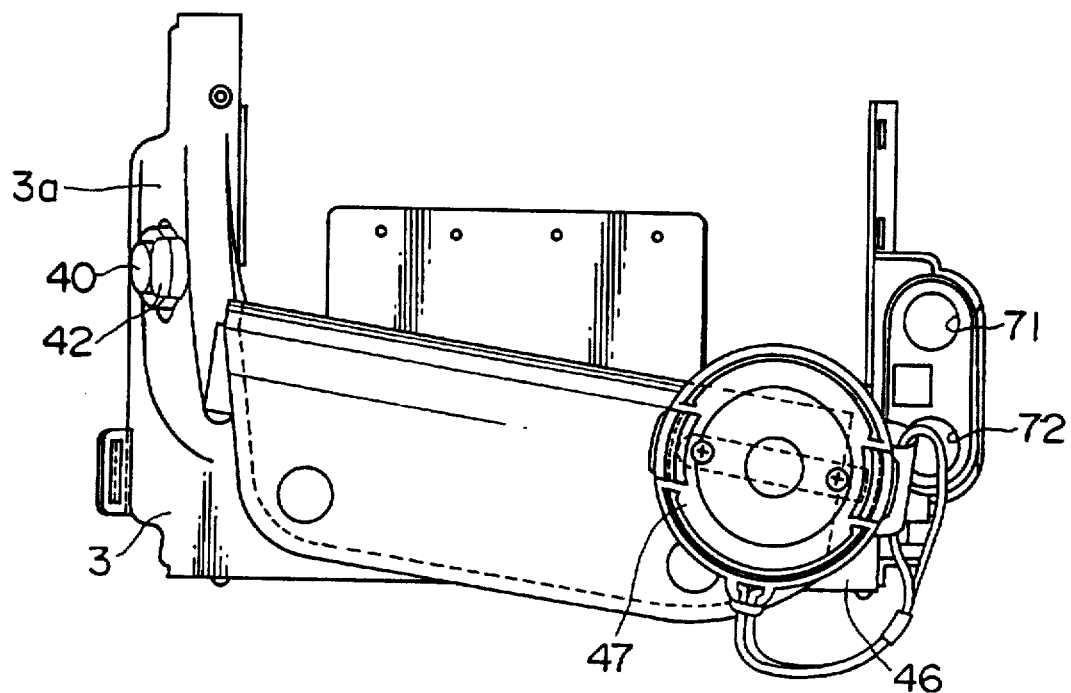
FIG. 14 is an illustrative view for showing a fixing state of a grip belt, a holder and a lens cap.

As shown in FIG. 12, the eye lens barrel 60 is comprised of a cylindrical finder holder 61 slidably arranged at an outer circumferential surface of the extreme end 50c of the view finder main unit 50 and having four projected pins 54 at the outer circumferential surface of the extreme end 50c inserted into four L-shaped lead holes 61b formed in equally-spaced apart relation at a large diameter part 61a; a cylindrical finder cover 62 having a pair of holes 62a and 62a engaged with the engaging parts 61d of a pair of flanges 61c formed at the large diameter part 61a of the finder holder 61; a lens holder 64 rotatably fitted in the small diameter part 61e of the finder holder 61 and having a lens 63 fitted therein; a visibility adjusting ring (a visibility adjusting means) 65 rotatably fitted to the outer circumferential surface of the small diameter part 61e of the finder holder 61 and having a pair of pins 65a and 65a projected at its inner circumferential surface to be engaged with the lead grooves 64a and 64a integrally formed slantly at the outer circumferential surface of the lens holder 64 from a pair of T-shaped recesses 61f formed at the small diameter part 61e; an eye cap holder 66 having a pair of engaging holes 66a and 66a engaged with a pair of engaging parts 61g and 61g projected at the extreme end of the outer circumferential surface of the small diameter part 61e of the finder holder 61; and a rubber eye cap 67 fitted to the eye cap holder 66.

The finder holder 61 is constructed such that a complete state of retraction (shrinkage) in respect to the view finder main unit 50 can be maintained by an engagement of the first projection 61b' formed at each of the lead holes 61 with each of the pins 54 of the view finder main unit 50, and further a complete state of an advancement (extension) in respect to the view finder main unit 50 can be maintained by an engagement of the second projection 61b" formed at each of the lead holes 61 with each of the pins 54 of the view finder main unit 50.

An outer circumferential surface of the lens holder 64 is formed with a pair of thrust grooves 64b and 64b extending axially. Each of the thrust grooves 64a is engaged with a pair of thrust projections 61h and 61h projected to extend in a thrusting direction at an inner circumferential surface of the small diameter part 61e of the finder holder 61. With such an arrangement, if the visibility adjusting ring 65 is rotated in a clockwise direction or a counter-clockwise direction, the lens holder 64 is moved in a forward or rearward direction in respect to the finder holder 61, whereby a focusing point of the lens 63 coincides with the CRT 51.

At a front upper part of the VTR main unit 2 is fixed a micro-phone 70 and at the same time an image input/output terminal 71 and a sound input/output terminal 72 are fixed to the front part of the grip 3. In addition, various operating buttons 73 of VTR are fixed at a central part of the upper surface 2a of the VTR main unit 2 and at the same time a substantial central part 4a of the left side surface 4 curved in a semi-cylindrical form and projected has various operating buttons 74 of the camera lens system. In addition, at a rear surface of the VTR main unit 2 is fixed a battery 75. Reference numeral 76 in FIG. 3 denotes a battery lock releasing button and reference numeral 77 in FIG. 6 denotes a tri-pod fixing screw hole arranged at a central part of the bottom surface 2c of the VTR main unit 2.

Figure 15:
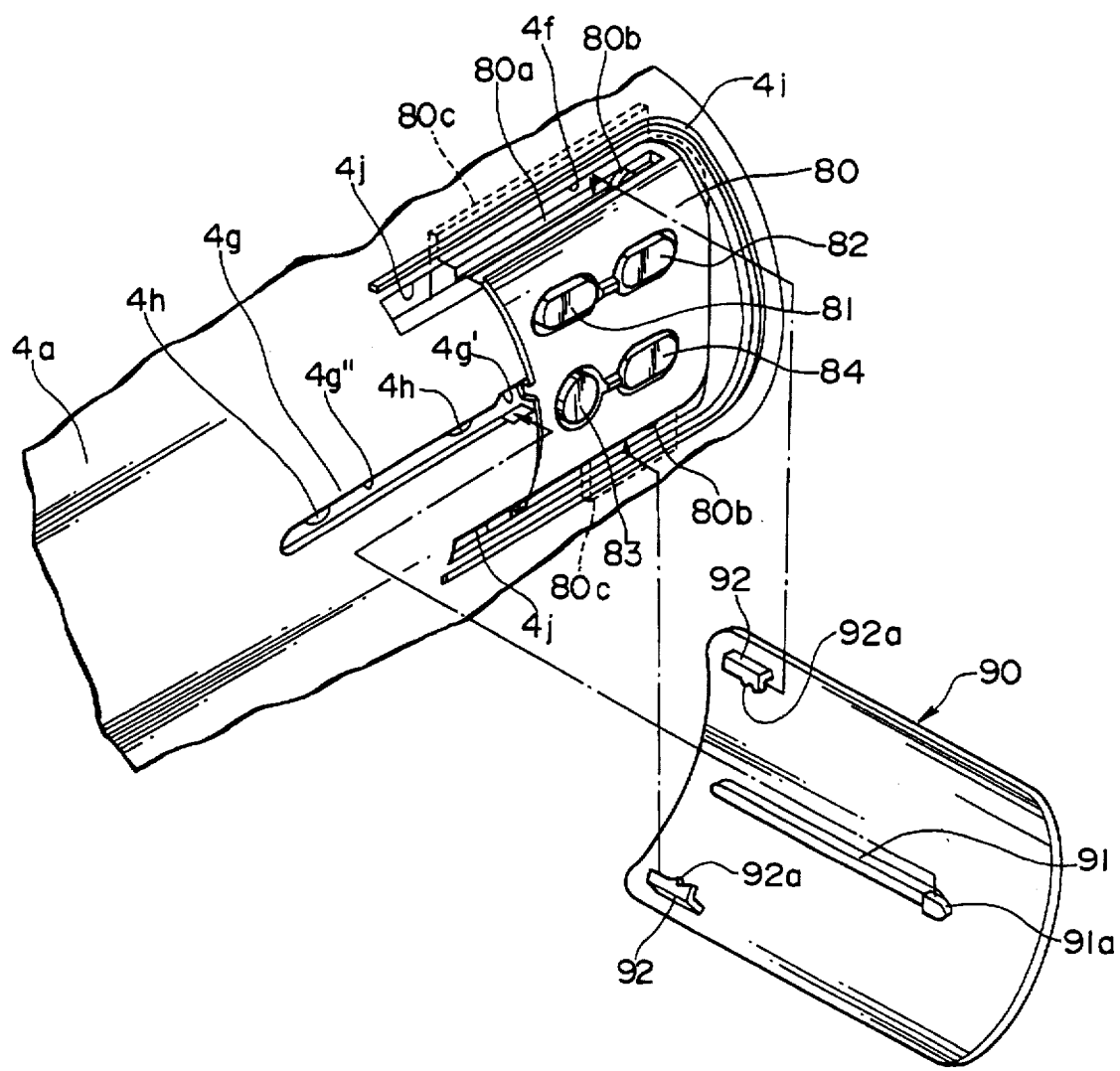
FIG. 15 is an exploded perspective view for showing a substantial part.
Figure 16:
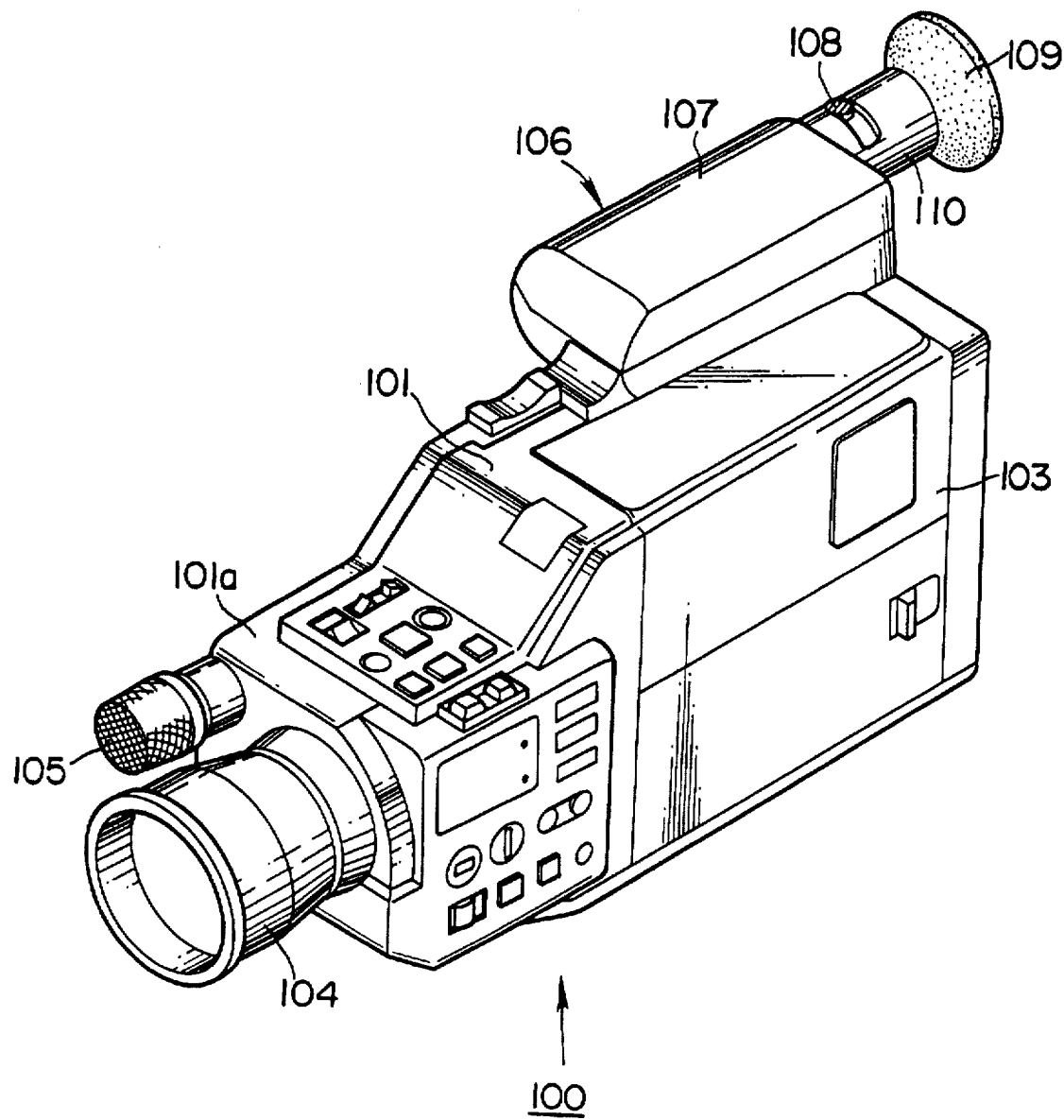
FIG. 16 is a perspective view for showing a prior art camera-mounted VTR.
Figure 17:
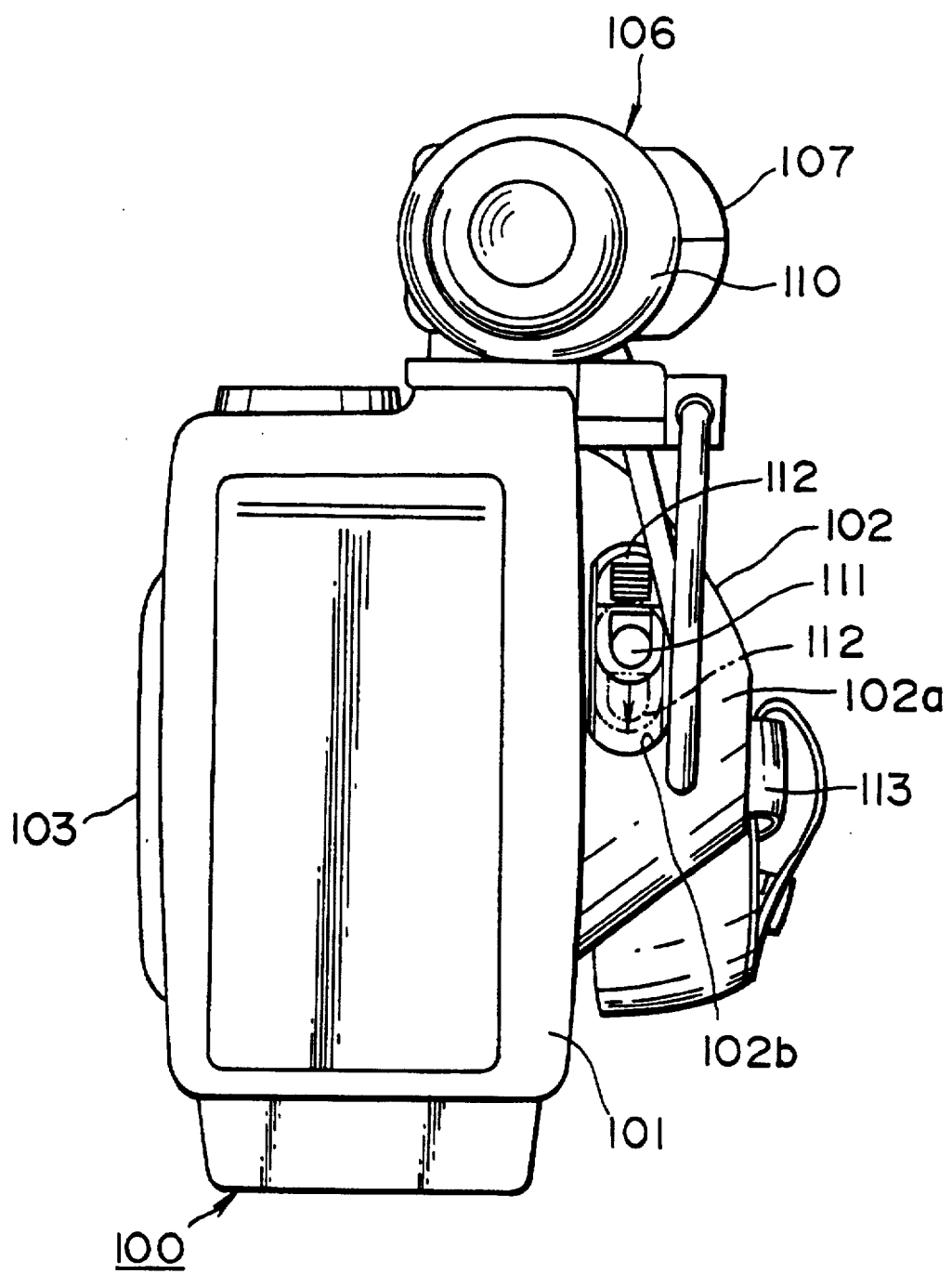
FIG. 17 is a rear view of the VTR of FIG. 16.

A white balance operating button 81, a shutter speed operating button 82, an inverse light correcting operation button 83 and a focus operating button 84 projected at a base block 80 of synthetic resin fitted to a substantial rectangular opening 4f formed at a rear part of the substantial central part 4a of various operating buttons 74 of the camera lens system arranged at the substantial central part 4a of synthetic resin of the left side surface 4 of the VTR main unit 2 can be hidden or exposed by a cover 90 slidably arranged at the substantial central part 4a (the hidden state by the cover 90 for each of the operating buttons 81 to 84 corresponds to a state where the cover 90 closes the opening 4f and the exposed state of each of the operating buttons 81 to 84 corresponds to the state where the over 90 opens the opening 4f). Describing in detail, this cover 90 is formed into a curved plate by a synthetic resin so as to align along the substantial central part 4a. At the inner central surface of the cover 90 is integrally projected and formed a central projection 91 fitted to the concave guide groove 4g of an inverted T-shape integrally formed in a horizontal manner at the central part of the substantial central part 4a. At the rear upper and lower edges of the inner surface are integrally projected and formed a pair of L-shaped projections 92 and 92 fitted to each of the guide grooves 80a and 80a of concave shape formed at the central parts of the upper and lower end surfaces of the base block 80, respectively. The extreme end 91a of the central projection 91 is projected and formed in a T-shape and as shown in FIG. 15, it is inserted from the large diameter part 4g' of the guide groove 4g and engaged with its small diameter part 4g". It is further locked to a pair of convex springs 4h and 4h fixed within the guide groove 4g in a predetermined spaced-apart relation to enable the opening or closing state of the cover 90 to be held. A pair of projections 92 and 92 are inserted into the clearance formed between the upper and lower edge surfaces of the opening 4f and the upper and lower end surfaces of the base block 80. It is slidably engaged with a pair of guide inner grooves 80a and 80a. Each of the extreme ends 92a of the pair of projections 92 and 92 is projected in a mountain-shape and integrally formed, locked to each of the convex springs 80b fixed to the pair of guide inner grooves 80a and 80a so as to enable the closed state of the cover 90 to be kept at its closed state. The upper and lower edges 80c and 80c of the base block 80 are fixed to the inner wall of the substantial central part 4a by means of melting and adhering or the like. When the cover 90 is closed, its pair of projections 92 and 92 are positioned at a pair of recesses 4j and 4j extending from the opening 4f. In addition, reference numeral 4i in FIG. 3 denotes a projection integrally projected at a central part 4a in a -shape. In addition, reference numerals 85, 86 and 87 denote a memory operating button, a color/mode operating button and a superimpose ON/OFF selector button which constitute a part of various operating buttons 74 of the camera lens system.

According to the camera-mounted VTR of the preferred embodiment, the VTR deck 5 is arranged at the grip 3 of the VTR main unit 2, the camera lens 6 is arranged at the front part opposite to the grip 3 of the VTR main unit 2 and at the same time the view finder 9 is arranged from the upper part to the rear part, so that the VTR deck 5, the camera lens 6 and the view finder 9 can be set in compact and at the same time its entire length can be substantially shortened as compared with that of the prior art. Accordingly, the entire camera-mounted VTR 1 can be made small in size.

Figure 2:
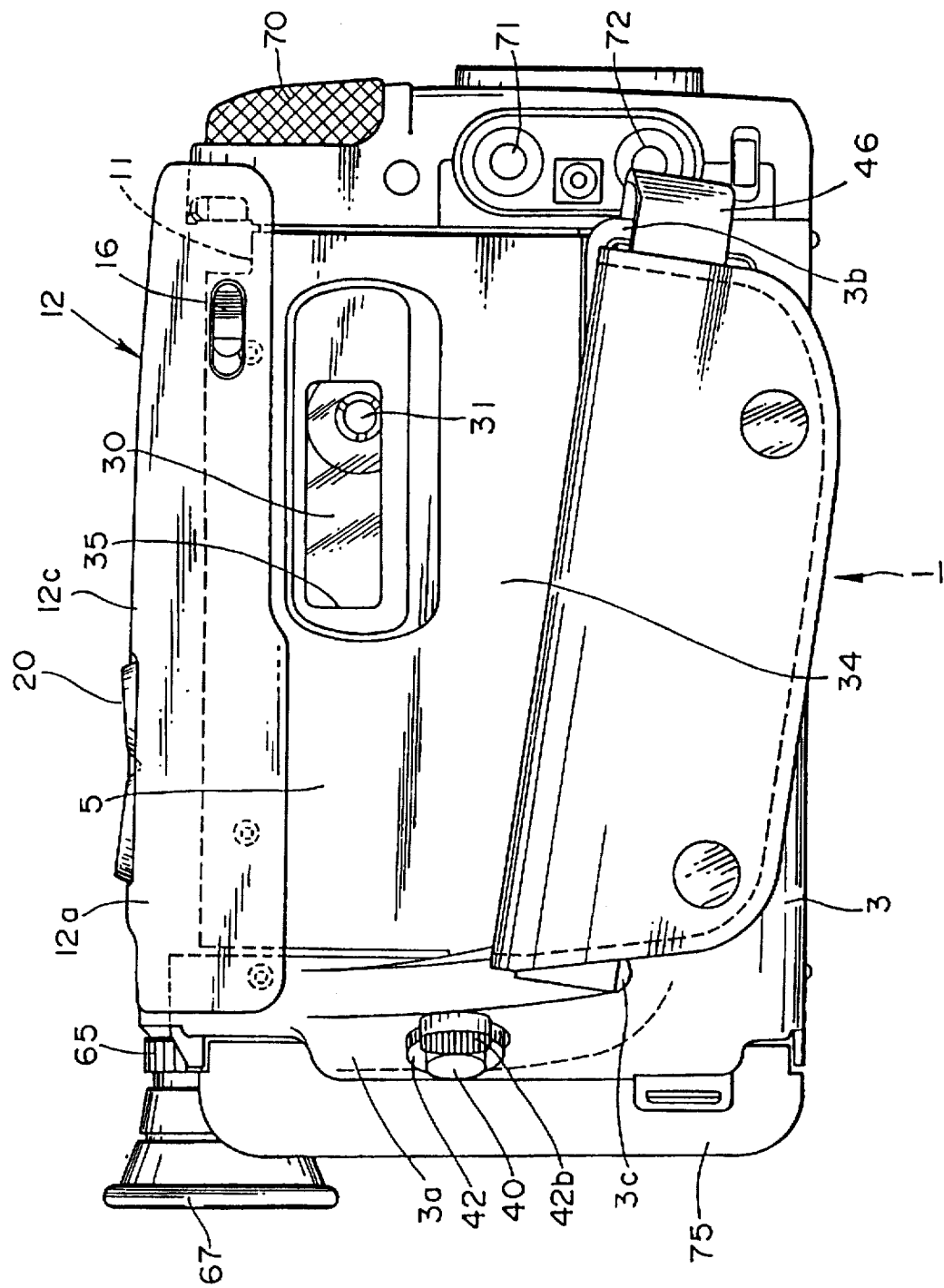
FIG. 2 is a right side elevational view of the VTR.

In particular, the eye lens barrel 60 of the view finder 9 is arranged to advance or retract in respect to the view finder main unit 50 and in case that the device is not used, as shown in FIG. 2, the eye cap 67 can be retracted near a battery 75 of the VTR main unit 2, the entire size of the set can be made smaller than that of the prior art and its carrying over may easily be performed.

In case of performing a low angle viewing, the view finder 9 is raised at a vertical state and even if the eyes are moved away from the eye cap 67, a mere slight advancing or retracting of the eye lens barrel 60 in respect to the view finder main unit 50 enables the visibility of the CRT 51 to be easily adjusted and further a screen alignment may easily be performed. In this case, since the recording button 55 is arranged at the step 4b which is hidden by the view finder main unit 50 during its slant state, if the view finder 9 is raised, the recording button 55 may more easily be acknowledged seen than the recording button 40 at the rear surface 3a of the grip 3, and it may easily be depressed, and an easy recording can be carried out as well, and its convenience in use can be improved.

Further, since the left side surface 4 opposite to the grip part 3 of the VTR main unit 2 can have a sufficient spacing for arranging various operating buttons 74 or the like, it is possible to improve the arrangement or a degree of freedom of a size of various operating buttons 74 or the like. In particular, since each of the operating buttons 81 to 84 arranged at the substantial central part 4a of the left side surface 4 is hidden or exposed by the cover 90, if each of the operating buttons 81 to 84 is not used, the cover 90 is closed to positively prevent an erroneous operation of each of the operating buttons 81 to 84. Closing of the cover 90 prevents dust from adhering to each of the operating buttons 81 to 84. Since a central projection 91 engaged with the guide groove 4g formed at the central part of the substantial central part 4a is projected at the central part of the inner surface of the cover 90, the cover 90 is slid smoothly along the substantial central part 4a. A pair of projections 92 and 92 of the cover 90 are engaged with the guide grooves 80a and 80a of the upper and lower end surfaces of the base block 80 and can not be seen from outside, an outer appearance of each of the operating buttons 81 to 84 can be made compact when the cover 90 is opened or closed and its esthetic appearance can be improved.

Further, since the upper surface of the grip 3 is provided with the zoom operating button 20, its operating characteristic can be improved and its convenience in use can be quite improved.

Figure 5:
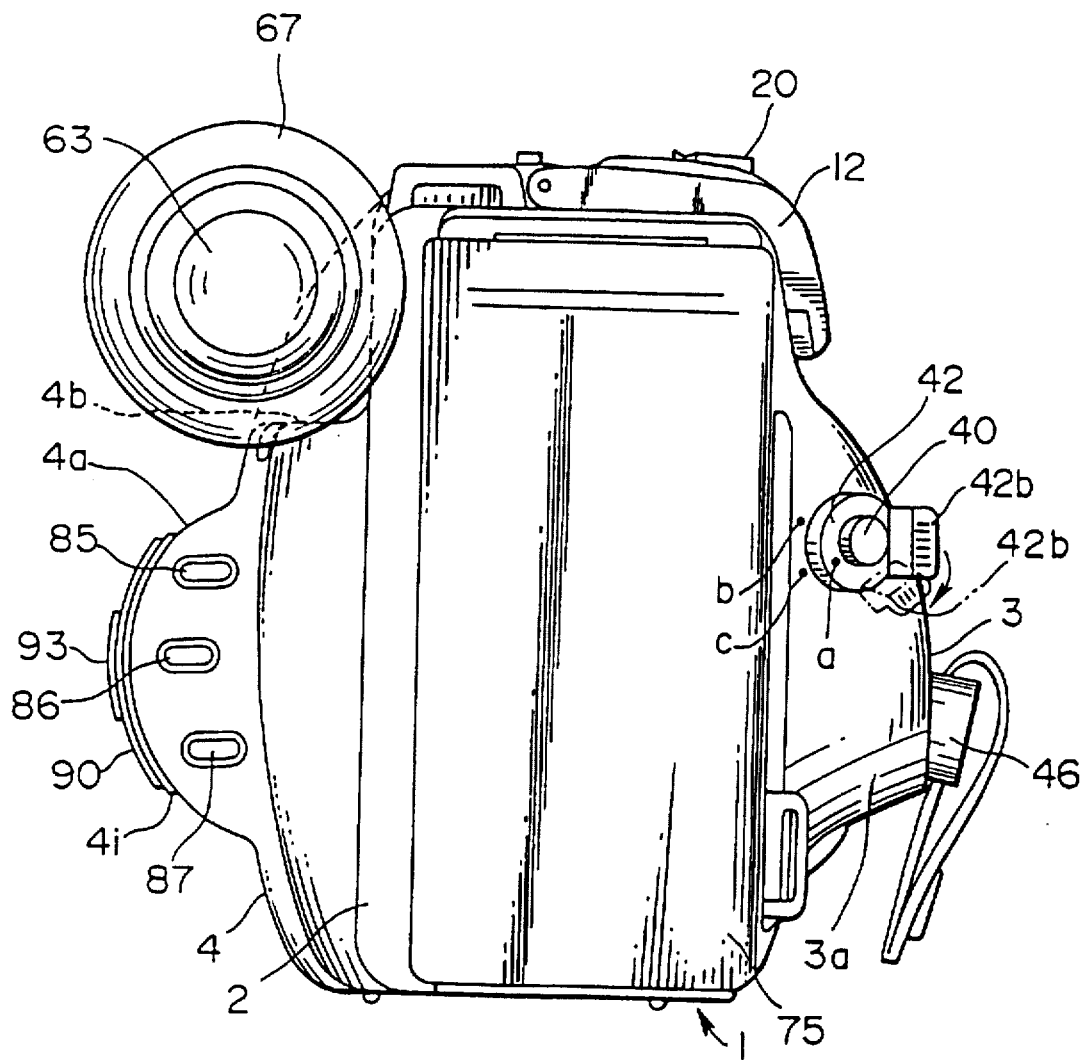
FIG. 5 is a rear view of the VTR.
Figure 6:
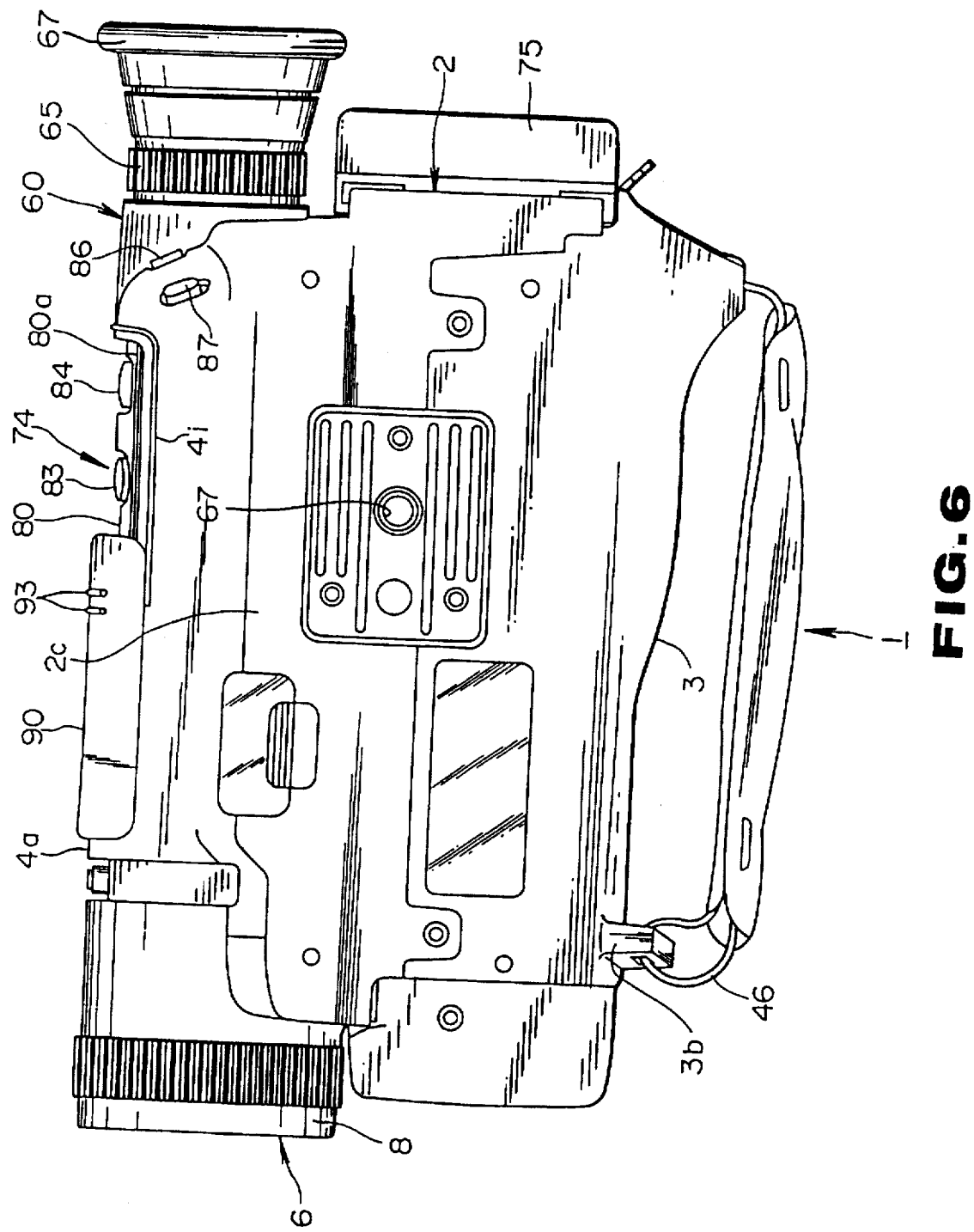
FIG. 6 is a bottom view of the VTR.
Figure 7:
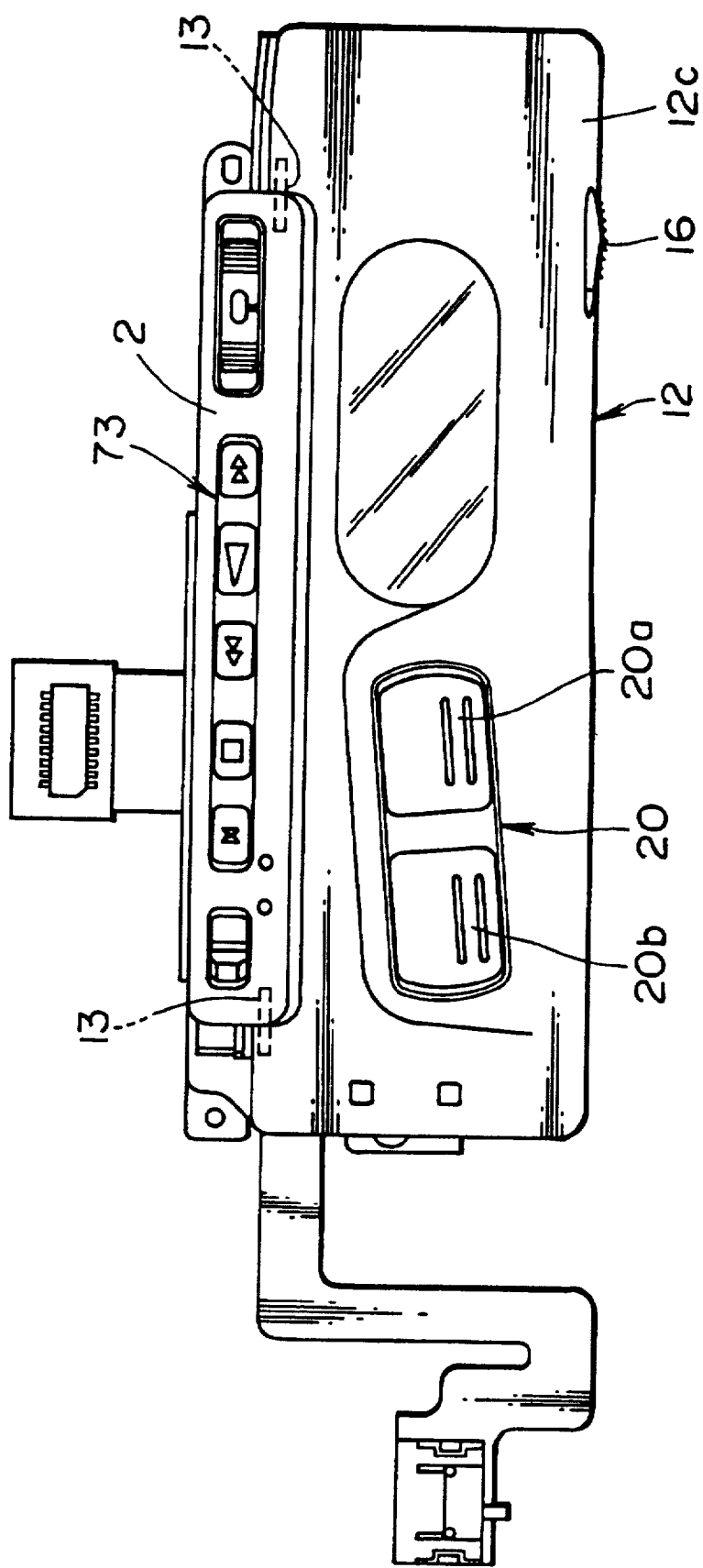
FIG. 7 is a front elevational view of a lid member.
Figure 8:
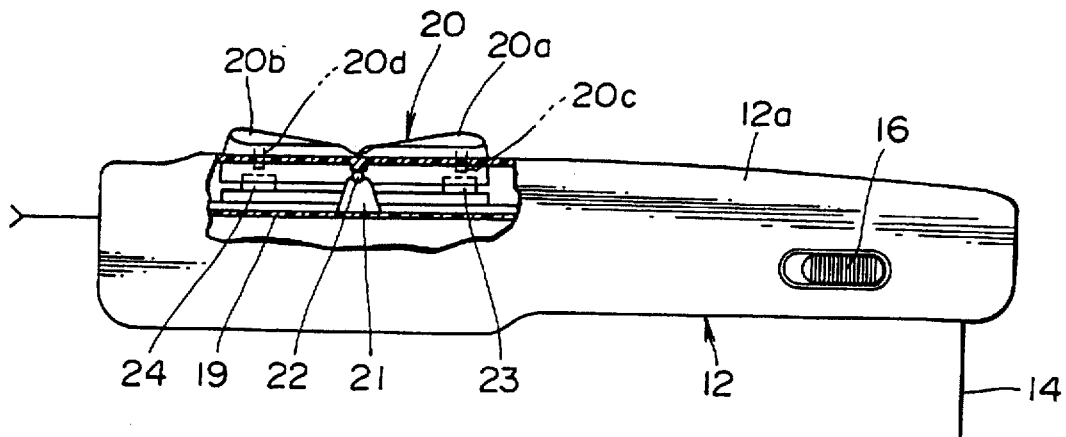
FIG. 8 is a side elevational view for showing a substantial part of the lid member with a part being in section.
Figure 9:
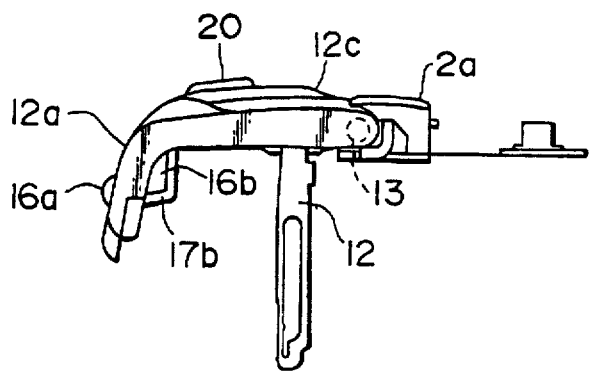
FIG. 9 is a front elevational view of the lid member.

In addition, as shown in FIG. 5, when the operating part 42b of the operating lever 42 for releasing the locked state of the recording button 40 during recording operation reaches the standby position, it reaches a position of the thumb of the user, the operating part 42b can be used as a finger rest and its use is convenient.

As described above, the present invention provides the view finder in the VTR main unit in such a way as it may be raised or inclined and at the same time the recording button is placed at a location where it is hidden by the view finder when the VTR main unit is inclined, so that if the view finder is raised and used at its low angle viewing state, the recording button may easily be acknowledged and may easily be operated, its recording operation may easily performed and its convenience in use can be improved.

What is claimed is:

1. A camera-mounted VTR having a main unit and a grip part at one side of said main unit for holding said main unit, characterized in that a view finder is arranged on said main unit for movement with respect to said main unit between a first position and another position, a recording button is arranged at a location hidden by the view finder when said view finder is in said first position and exposed when said view finder is in said other position, various operating buttons are arranged at a surface opposite to the grip of the main unit of the VTR, and a cover is mounted on said VTR for sliding between a position hiding said various operating buttons and a position exposing said various operating buttons.

wherein said cover has a central inner surface, and a central projection is positioned on said central inner surface, said main unit of the VTR having a side surface defining a substantially central part, said substantially central part having a guide groove, said central projection engaging said guide groove.

2. A camera-mounted VTR having a main unit and a grip part at one side of said main unit for holding said main unit, characterized in that a view finder is arranged on said main unit for movement with respect to said main unit between a first position and another position, a recording button is arranged at a location hidden by the view finder when said view finder is in said first position and exposed when said view finder is in said other position, various operating buttons are arranged at a surface opposite to the grip of the main unit of the VTR, and a cover is mounted on said VTR for sliding between a position hiding said various operating buttons and a position exposing said various operation buttons, wherein said cover has an inner surface and a pair of projections on said inner surface, and inner grooves are defined in said VTR above and below said various operating buttons, said projections engaging said inner guide grooves.

3. A camera mounted VTR comprising:

a main unit;

lens formed within said main unit;

a grip portion formed on a portion of said main unit;

a first recording button located on said main unit;

a view finder pivotally attached to an upper portion of said main unit, said view finder being movable from a first position to a second position, said first position being one in which the central axis of said view finder is substantially parallel to the optical axis of said lens;

a second recording button located on said unit beneath said first position of said view finder whereby said view finder conceals said second recording button when in said first position;

a plurality of operating buttons arranged on a side surface of said main unit;

a guide groove formed on said side surface; and a cover having a central projection which engages said guide groove whereby said cover slides between a position hiding said plurality of operating buttons and a position exposing said operating buttons.

* * * * *

UNITED STATES PATENT AND TRADEMARK OFFICE
CERTIFICATE OF CORRECTION

PATENT NO. : 5,893,649
DATED : April 13, 1999
INVENTOR(S) : Mitsuhiro SHIMADA

It is certified that error appears in the above-identified patent and that said Letters Patent is hereby corrected as shown below: In the Claims:

Claim 1 should read:

1. A camera-mounted VTR having a main unit and a grip part at one side of said main unit for holding said main unit, characterized in that a view finder is arranged on said main unit for movement with respect to said main unit between a first position and another position, a recording button is arranged at a

UNITED STATES PATENT AND TRADEMARK OFFICE
CERTIFICATE OF CORRECTION

PATENT NO. : 5,893,649
DATED : April 13, 1999
INVENTOR(S) : Mitsuhiro SHIMADA

It is certified that error appears in the above-identified patent and that said Letters Patent is hereby corrected as shown below:

location hidden by the view finder when said view finder is in said first position and exposed when said view finder is in said other position, various operating buttons are arranged at a surface opposite to the grip of the main unit of the VTR, and a cover is mounted on said VTR for sliding between a position hiding said various operating buttons, and a position exposing said various operating buttons, wherein said cover has a central inner surface, and a central projection is positioned on said central inner surface, said main unit of the VTR having a side surface defining a substantially central part, said substantially central part having a guide groove, said central projection engaging said guide groove.

Claim 2 should read:

2. A camera-mounted VTR having a main unit and a grip part at one side of said main unit for holding said main unit,

UNITED STATES PATENT AND TRADEMARK OFFICE
CERTIFICATE OF CORRECTION

PATENT NO. : 5,893,649
DATED : April 13, 1999
INVENTOR(S) : Mitsuhiro SHIMADA

It is certified that error appears in the above-identified patent and that said Letters Patent is hereby corrected as shown below:

characterized in that a view finder is arranged on said main unit for movement with respect to said main unit between a first position and another position, a recording button is arranged at a location hidden by the view finder when said view finder is in said first position and exposed when said view finder is in said other position, various operating buttons are arranged at a surface opposite to the grip of the main unit of the VTR, and a cover is mounted on said VTR for sliding between a position hiding said various operating buttons and a position exposing said various operating buttons, wherein said cover has an inner surface and a pair of projections on said inner surface, and inner grooves are defined

UNITED STATES PATENT AND TRADEMARK OFFICE
CERTIFICATE OF CORRECTION

PATENT NO. : 5,893,649
DATED      : April 13, 1999
INVENTOR(S): Mitsuhiro SHIMADA It is certified that error appears in the above-identified patent and that said Letters Patent is hereby corrected as shown below:

in said VTR above and below said various operating buttons, said projections engaging said inner guide grooves.

Signed and Sealed this

First Day of February, 2000

Attest:

Attesting Officer

Q. TODD DICKINSON

Acting Commissioner of Patents and Trademarks